(12) United States Patent
Palazzolo et al.

(10) Patent No.: US 10,309,522 B2
(45) Date of Patent: Jun. 4, 2019

(54) TRANSFER CASE PUMP WITH MULTIPLE FLOW PATHS TO INTERNAL COMPONENTS

(71) Applicant: BorgWarner Inc., Auburn Hills, MI (US)

(72) Inventors: Michael Robert Palazzolo, Madison Heights, MI (US); David F. Haselton, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 335 days.

(21) Appl. No.: 15/412,601

(22) Filed: Jan. 23, 2017

(65) Prior Publication Data

US 2018/0209533 A1    Jul. 26, 2018

(51) Int. Cl.
| | |
|---|---|
| *F16H 57/04* | (2010.01) |
| *B60K 17/344* | (2006.01) |
| *B60K 23/08* | (2006.01) |
| *F16H 37/06* | (2006.01) |
| *B60K 17/02* | (2006.01) |
| *B60K 17/348* | (2006.01) |
| *B60K 17/35* | (2006.01) |
| *F16H 57/05* | (2006.01) |

(52) U.S. Cl.
CPC ......... *F16H 57/0435* (2013.01); *B60K 17/02* (2013.01); *B60K 17/344* (2013.01); *B60K 17/348* (2013.01); *B60K 17/35* (2013.01); *B60K 23/08* (2013.01); *F16H 37/065* (2013.01); *F16H 57/043* (2013.01); *B60Y 2306/03* (2013.01); *F16H 57/0473* (2013.01); *F16H 57/0486* (2013.01); *F16H 57/05* (2013.01)

(58) Field of Classification Search
CPC ...... B60K 17/02; B60K 17/348; B60K 17/35; B60K 23/08; B60K 17/344; F16H 57/0435; F16H 57/043; F16H 37/065; F16H 57/05; F16H 57/0486; F16H 57/0473; F16H 57/0432; F16H 57/0426; B60Y 2306/03
See application file for complete search history.

(56) References Cited

U.S. PATENT DOCUMENTS

| | | | | |
|---|---|---|---|---|
| 4,590,820 | A * | 5/1986 | Hambric | F16H 1/22 74/467 |
| 4,770,280 | A * | 9/1988 | Frost | B60K 17/344 180/247 |
| 4,903,804 | A * | 2/1990 | Beccaris | F16D 25/0638 192/56.31 |
| 4,924,989 | A * | 5/1990 | Filderman | F16D 25/02 192/103 F |
| 5,013,287 | A * | 5/1991 | Hayakawa | F16H 41/24 475/59 |

(Continued)

*Primary Examiner* — Paul N Dickson
*Assistant Examiner* — Timothy Wilhelm
(74) *Attorney, Agent, or Firm* — Miller, Matthias & Hull LLP

(57) ABSTRACT

A lubrication system for a transfer case includes a pump in fluid communication with a lubricant source and a power transfer assembly, as well as one or more valves positioned along fluid flow paths between the lubricant source and the power transfer assembly. The valves may allow full fluid flow or may restrict fluid flow to various components of the transfer case as conditions warrant. A fluid guide insert may be used to help direct lubricant flow to the components.

19 Claims, 6 Drawing Sheets

(56) References Cited

U.S. PATENT DOCUMENTS

| | | | | |
|---|---|---|---|---|
| 5,221,101 A * | 6/1993 | Okubo | B60K 17/3505 | 180/247 |
| 5,330,030 A * | 7/1994 | Eastman | B60K 17/344 | 180/233 |
| 5,341,901 A * | 8/1994 | Mueller | F16H 57/043 | 184/27.1 |
| 5,667,036 A * | 9/1997 | Mueller | F16H 57/043 | 184/11.1 |
| 5,704,863 A * | 1/1998 | Zalewski | B60K 17/344 | 180/247 |
| 5,788,038 A * | 8/1998 | Hickey | B60K 23/00 | 192/85.16 |
| 5,819,192 A * | 10/1998 | Wakahara | B60K 23/0808 | 701/67 |
| 5,884,526 A * | 3/1999 | Fogelberg | B60K 17/344 | 192/82 P |
| 5,951,429 A * | 9/1999 | Eastman | B60K 17/3462 | 475/204 |
| 6,030,311 A * | 2/2000 | Osumi | F16H 37/086 | 476/10 |
| 6,099,430 A * | 8/2000 | Winks | F16D 28/00 | 192/12 D |
| 6,112,874 A * | 9/2000 | Kopp | F16D 25/02 | 192/35 |
| 6,161,643 A * | 12/2000 | Bober | B60K 17/20 | 180/197 |
| 6,330,928 B1 * | 12/2001 | Sekiya | B60K 17/3505 | 180/197 |
| 6,602,159 B1 * | 8/2003 | Williams | B60K 17/3462 | 180/247 |
| 6,969,334 B2 * | 11/2005 | Schleuder | F16H 57/021 | 475/213 |
| 6,974,400 B2 * | 12/2005 | Williams | B60K 17/3462 | 180/247 |
| 7,004,874 B2 * | 2/2006 | Mizon | B60K 17/35 | 192/38 |
| 7,004,875 B2 * | 2/2006 | Williams | B60K 23/08 | 192/38 |
| 7,178,652 B2 * | 2/2007 | Mueller | B60K 17/16 | 192/84.6 |
| 7,624,853 B2 * | 12/2009 | Ekonen | F16D 27/115 | 192/113.3 |
| 7,635,055 B2 * | 12/2009 | Ekonen | F16D 27/115 | 192/20 |
| 7,828,130 B2 * | 11/2010 | Ekonen | F16D 27/115 | 192/113.3 |
| 8,005,599 B2 * | 8/2011 | Satou | F16H 57/0435 | 475/159 |
| 8,025,081 B2 * | 9/2011 | Poskie | F16H 57/043 | 138/114 |
| 8,092,334 B2 * | 1/2012 | Peura | B60K 17/346 | 475/200 |
| 8,105,196 B2 * | 1/2012 | Portell | F16H 3/66 | 475/116 |
| 8,151,965 B2 * | 4/2012 | Linortner | B60K 17/35 | 192/103 F |
| 8,308,462 B2 * | 11/2012 | Mohan | F04C 15/0061 | 192/56.1 |
| 8,491,289 B2 * | 7/2013 | Showalter | F04C 2/10 | 418/133 |
| 8,905,212 B2 * | 12/2014 | Vierk | F16D 11/14 | 192/53.1 |
| 9,347,541 B2 * | 5/2016 | Brooks | F16H 48/10 | |
| 9,377,063 B2 * | 6/2016 | Yoshino | F16D 48/066 | |
| 9,440,532 B1 * | 9/2016 | Jongebloed | F16D 13/74 | |
| 9,441,726 B1 * | 9/2016 | Palazzolo | F16H 57/0436 | |
| 9,568,091 B2 * | 2/2017 | Drill | F16H 57/0457 | |
| 9,709,102 B2 * | 7/2017 | Samie | F16D 25/044 | |
| 9,764,739 B2 * | 9/2017 | Deutsch | F16H 57/0435 | |
| 9,964,210 B1 * | 5/2018 | Jaszewski | F16H 63/3003 | |
| 9,976,483 B2 * | 5/2018 | Venter | F01D 25/20 | |
| 10,012,269 B2 * | 7/2018 | Yoshino | F16D 11/14 | |
| 10,060,485 B2 * | 8/2018 | Vierk | F16D 11/14 | |
| 2004/0163916 A1 * | 8/2004 | Showalter | B60K 17/3467 | 192/48.2 |
| 2006/0191746 A1 * | 8/2006 | Diosi | F16C 3/02 | 184/6.18 |
| 2014/0366685 A1 * | 12/2014 | Mueller | B60K 17/35 | 74/664 |
| 2015/0240935 A1 | 8/2015 | Kampe et al. | | |
| 2016/0160713 A1 * | 6/2016 | Reedy | F01M 1/02 | 184/6.28 |
| 2016/0363201 A1 * | 12/2016 | McNally | B60K 17/3467 | |
| 2017/0036538 A1 * | 2/2017 | Imafuku | B60K 17/3467 | |
| 2017/0037955 A1 * | 2/2017 | Cudok | B60K 6/48 | |
| 2017/0158053 A1 * | 6/2017 | Bunyan | B60K 17/344 | |
| 2017/0184161 A1 * | 6/2017 | Schmidt | F16D 48/06 | |
| 2017/0284510 A1 * | 10/2017 | Iwaki | F16D 25/0638 | |
| 2018/0038425 A1 * | 2/2018 | Kimes | F16D 23/02 | |

* cited by examiner

TRANSFER CASE PUMP WITH MULTIPLE FLOW PATHS TO INTERNAL COMPONENTS

FIELD OF THE DISCLOSURE

The present disclosure generally relates to a lubrication system for a transfer case. More specifically, the disclosure relates to a lubrication system including a pump in fluid communication with a lubricant source and a system for distributing the lubricant among various components on an as needed basis.

BACKGROUND OF THE DISCLOSURE

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases may provide gear reduction to allow operation in a high range, which is typically a 1:1 drive ratio, or a low range, such as a 2:1 drive ratio.

Many of the components in a transfer case, including the clutch, require lubrication. One transfer case design includes a pump that may be mounted on either the input shaft or the primary output shaft. The pump delivers lubricant to the various components of the transfer case through an axial bore that is formed through the input shaft and/or the output shafts. Supply ports are formed through the input shaft and/or the output shafts at locations where lubrication is needed, such that the lubricant flows from the pump, through the axial bore, and out of the supply ports. This arrangement is effective, but offers little control over delivery of lubricant, for example, to the clutch that has variable lubrication needs depending on the mode and range of vehicle operation.

SUMMARY OF THE DISCLOSURE

A lubrication system for a transfer case is provided that includes a pump in fluid communication with a lubricant source and a power transfer assembly, as well as one or more valves positioned along fluid flow paths between the lubricant source and the power transfer assembly. The valves may allow full fluid flow or may restrict fluid flow to various components of the transfer case as conditions warrant. A fluid guide insert may be used to help direct lubricant flow to the components.

In one aspect of the disclosed embodiments, a lubrication system for a transfer case is provided comprising a pump, a node, a power transfer assembly, a fluid guide insert, a first valve and a control. The pump is operable to supply a lubricant along at least two fluid flow paths extending from a lubricant source to one or more transfer case components, and comprises a pump inlet in fluid communication with the lubricant source and a pump outlet in fluid communication with one or more transfer case components. The node is in fluid communication with the pump outlet and is configured to divide fluid flow into a first conduit and a second conduit arranged in parallel. The power transfer assembly includes a first inlet port, a second inlet port located downstream of and in fluid communication with the second conduit, one or more first outlet ports in fluid communication with the first inlet port and one or more second outlet ports in fluid communication with the second inlet port. The fluid guide insert may be disposed within the power transfer assembly and is configured to direct the flow of fluid from the first inlet port to the first outlet ports and from the second inlet port to the second outlet ports. The first valve is disposed along the first conduit extending between the node and the power transfer assembly. The first valve includes a first valve inlet, a first valve outlet and a first valve alternative outlet. The first valve outlet and the first valve alternative outlet are located upstream and in fluid communication with the first valve inlet. The first valve outlet and the first valve alternative outlet are located downstream and in fluid communication with the first inlet port of the power transfer assembly. The first valve is operable between a first state in which fluid flows through the first valve outlet and is not restricted and a second state in which fluid flows through the first valve alternative outlet and is restricted. The control is operable to set the state of the first valve to either the first state or the second state.

In another aspect the lubrication system includes a second valve disposed along the second conduit extending between the node and the power transfer assembly. The second valve includes a second valve inlet, a second valve outlet and an alternative second valve outlet. The second valve is operable between a first state in which fluid flow is not restricted and a second state in which fluid flow is restricted. A second valve control is operable to set the state of the second valve to either the first state or the second state.

In still another aspect the lubrication system includes a third valve. The third valve is disposed along the oil feed conduit extending between the lubricant source and the pump, and includes a third valve inlet, a third valve outlet and an third valve alternative outlet. The third valve is operable between a first state in which fluid flow is not restricted and a second state in which fluid flow is restricted. A third valve control is operable to set the state of the third valve to either the first state or the second state.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

The drawings are not necessarily to scale and may illustrate the disclosed embodiments diagrammatically and/or in partial views. In certain instances, the drawings may omit details which are not necessary for an understanding of the disclosed methods and apparatuses or which render other details difficult to perceive. This disclosure is not limited to the particular embodiments illustrated and described herein.

DETAILED DESCRIPTION

The disclosure herein is directed to a lubrication system for a transfer case comprising valve controls and a fluid guide insert located along the lubrication flow path between a sump, a pump, and various components of a power transfer assembly. The lubrication system can reduce the parasitic losses associated with driving pumping elements to pressurize lubricant. The lubrication system also can reduce spin losses associated with shear forces generated by an oil film between the friction and separator plates of a clutch when the clutch is not engaged.

Drivetrain and Transfer Case

Figure 1:
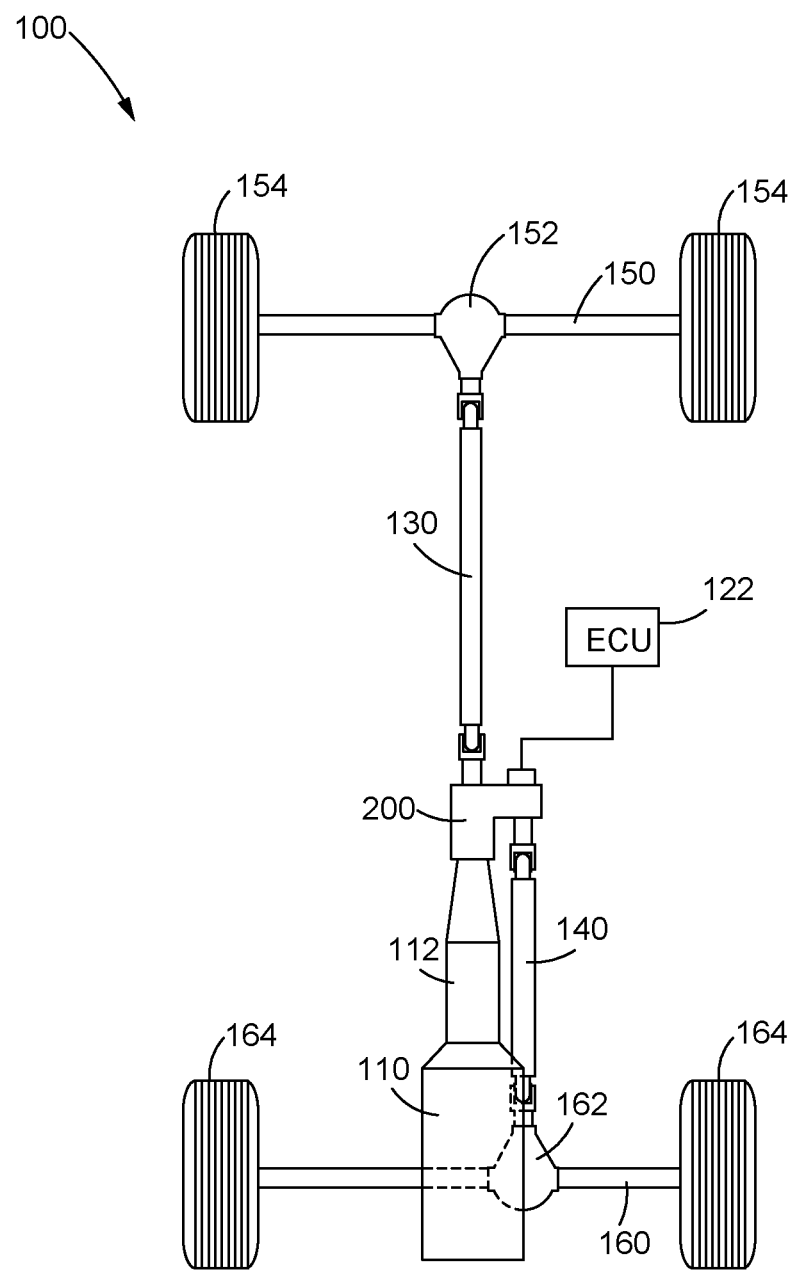
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 200. The transfer case 200 is operable to distribute driving power to a rear driveshaft 130 and a front driveshaft 140. The transfer case 200 can, in some implementations, include components that allow the transfer case to perform a mode shift between two or more different modes. For example, the transfer case 200 can allow operation of the vehicle in a rear-wheel drive mode in which only the rear driveshaft 130 receives driving power and the front driveshaft 140 does not. The transfer case 200 also can allow operation of the vehicle in a four-wheel drive mode in which the rear driveshaft 130 and the front driveshaft 140 both receive driving power. In this example, the rear driveshaft 130 is considered the primary driveshaft and the front driveshaft 140 is considered the secondary driveshaft. In other implementations, the front driveshaft 140 is the primary driveshaft and the rear driveshaft 130 is the secondary driveshaft, and the transfer case 200 performs a mode shift between a front-wheel drive mode and a four-wheel drive mode. In still other implementations, the transfer case 200 does not include components that allow a mode shift, and the transfer case 200 constantly provides driving power to both of the rear driveshaft 130 and the front driveshaft 140.

The transfer case 200 may also allow a range shift that selectively provides gear reduction to the output shaft(s). For example, the transfer case can include components for operating in a high range, such as a 1:1 drive ratio, or a low range, such as a 2:1 drive ratio. The range shift changes the transfer case 200 between operation in the low range and the high range by selectively coupling and uncoupling a gear reduction mechanism.

Operation of the transfer case 200 can be regulated by a controller such as an ECU 122 that provides signals to components of the transfer case 200 to cause the mode shift and/or the range shift. In other implementations, the mode shift and/or the range shift can be actuated mechanically such as by a driver-operated lever that is mechanically connected to a component of the transfer case 200.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
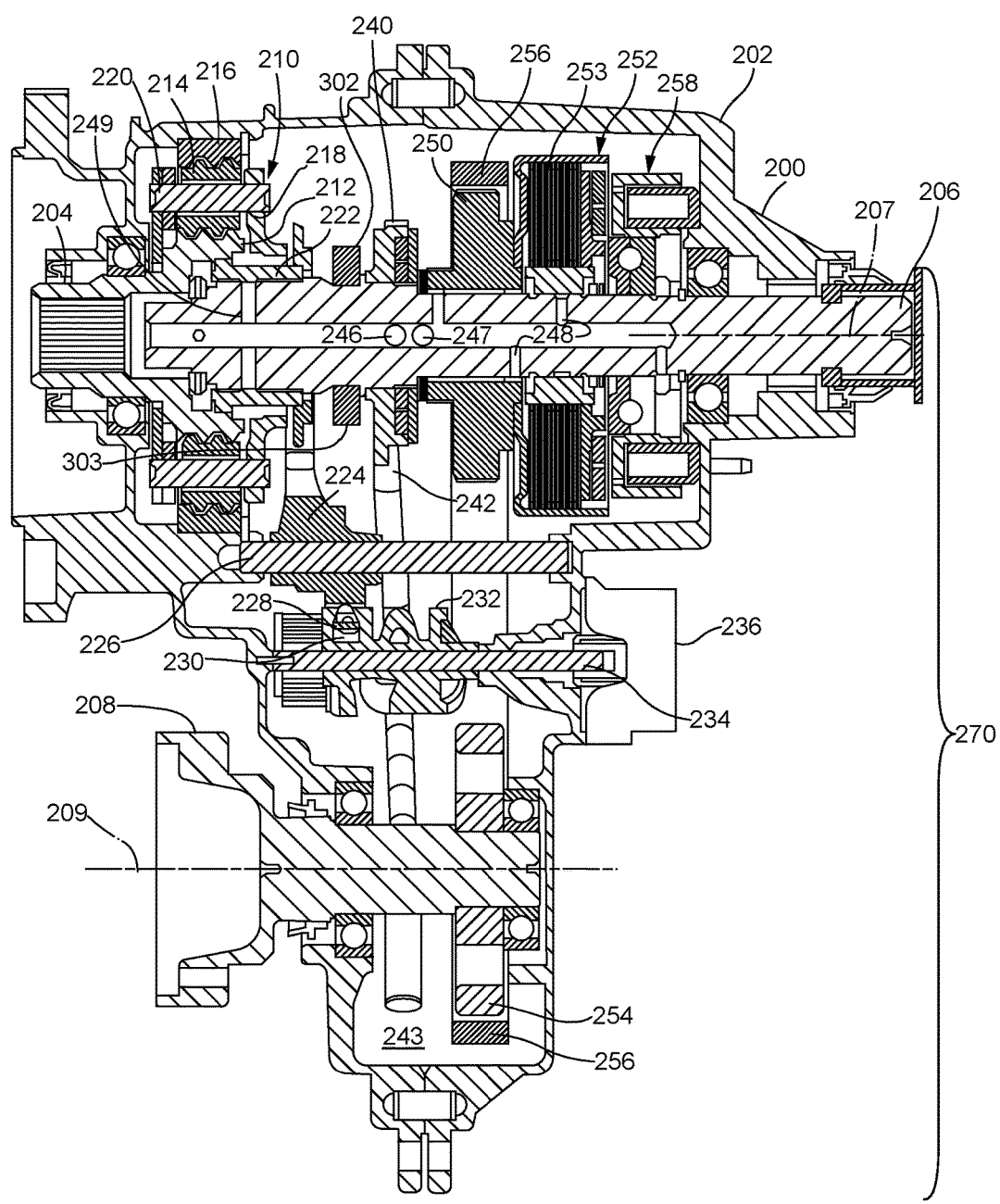
FIG. 2 is a cross-section illustration showing a transfer case that includes a lubrication system.

FIG. 2 is a cross-section illustration showing a transfer case 200. The transfer case 200 includes a housing 202 and rotating components including an input shaft 204 that extends out of the housing 202, a primary output shaft 206 that extends out of the housing 202, and a secondary output shaft 208 that extends out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 may form a power transfer assembly 270.

The input shaft 204 is at least partially hollow, and the primary output shaft 206 extends into the hollow interior of the input shaft 204. The input shaft 204 can be connected to the primary output shaft either directly or via a gear reduction mechanism 210. The gear reduction mechanism 210 can be a Ravigneaux planetary gear set that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch 222 is utilized to engage and disengage the gear reduction mechanism 210. In a first position of the dog clutch 222, the dog clutch 222 engages the input shaft 204 and the primary output shaft 206 directly, which establishes a 1:1 drive ratio and does not utilize the gear reduction mechanism 210. In a second position of the dog clutch 222 (not shown), the dog clutch 222 is shifted axially away from the input shaft 204 and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The dog clutch 222 is moved between its first and second positions by a first selector fork 224 which moves axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated by an electric motor 236 in response to control signals from a controller such as the ECU 122 of FIG. 1.

The transfer case 200 includes a pump 240 for pumping a lubricant (not shown) to components of the transfer case 200 that require lubrication. In this example, the pump 240 is arranged on the primary output shaft 206 and pumping elements of the pump 240 are driven by the primary output shaft 206. The pump 240 can be, for example, a gerotor pump. Other types of pumping mechanisms can also be utilized. For example, the pump 240 does not need to be driven by the input shaft 204 or the primary output shaft 206 and can instead be located off the first axis 207 and designed to distribute lubricant to only certain areas of the transfer case 200, such as the sun gear 212, the planet gears 214, and the ring gear 216. Regardless of the position of the pump 240, at least a portion of the housing 202 can serve as a sump 243, that is, a lubricant source, and the pump 240 can include an oil feed conduit 242 that extends into the sump 243 of the housing 202.

To route lubricant to various components of the transfer case 200, the lubrication system may comprise a fluid guide insert 500 (FIG. 6) located within an axially extending hollow bore 244 of the primary output shaft 206. The primary output shaft 206 includes a plurality of lubricant ports, each of which extends radially through the primary output shaft 206. The plurality of lubricant ports can include two or more inlet ports such as a first inlet port 246 and a second inlet port 247 and two or more sets of outlet ports such as a first outlet ports 248 and second outlet ports 249.

The pump 240 includes a pump inlet 241 in fluid communication with a lubricant source, a pump outlet 245 in fluid communication with the inlet ports 246, 247 of a power transfer assembly 270. As explained in more detail below, the inlet ports 246, 247 are aligned with an outlet of the pump 240 and receive the lubricant under pressure from the pump 240. The outlet ports 248, 249 may be positioned along the primary output shaft 206 near components that require lubrication. The lubricant is pressurized by the pump 240, travels through the inlet ports 246, 247, through or around the fluid guide insert 500, and out the outlet ports 248, 249 to lubricate various components in the transfer case 200. Excess lubricant may drain to the sump 243 inside the housing 202.

Some of the components in the transfer case 200 that require lubrication may include a first sprocket 250, a second sprocket 254 and the clutch 252. The first sprocket 250 may be arranged on the primary output shaft 206 and connected to the primary output shaft 206 by the clutch 252. The second sprocket 254 may be arranged on the secondary output shaft 208 and is connected for rotation in unison, such as by splines. The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged. The clutch 252 includes, for example, a clutch pack 253 of interleaved plates, with the clutch 252 being engaged when pressure is applied to the clutch pack 253 by an actuator 258.

In the illustrated example, the clutch 252 can allow active control of distribution of power between the primary output shaft 206 and the secondary output shaft 208, the clutch 252, the sprockets 250, 254, and the chain 256 serving as additional components within the power transfer assembly. In alternative implementations, different types of clutches or other mechanisms can be used to control transfer of power from either the input shaft 204 or the primary output shaft 206 to the secondary output shaft 208. For example, the transfer case 200 could be configured to couple or decouple the first sprocket 250 with respect to the primary output shaft 206 as in well-known part-time/manual transfer cases. Other means for driving the secondary output shaft 208 are also possible.

Sufficient lubrication for the various moving components within the transfer case 200 is important when the vehicle operates in the four-wheel drive mode, that is, when the sprockets 250, 254, the clutch 252, the chain 256, and the secondary output shaft 208 are in motion in addition to the primary output shaft 206. However, a lesser amount of lubrication, or in some cases, intermittent lubrication, may be needed when the vehicle operates in a two-wheel drive mode. Operating the pump 240 to produce the same level of lubrication during two-wheel drive mode operation as in four-wheel drive mode operation when the extra lubrication is not necessary can cause a reduction in fuel efficiency. Further, when the clutch 252 is disengaged in two-wheel drive mode, excessive lubrication can cause spin losses when shear forces are generated by a lubricant film formed between the interleaved plates of the clutch pack 253. Thus, a lubrication system comprising one or more valves that accounts for differing lubrication needs based on the applicable mode of operation is described below.

One Valve System

Figure 3:
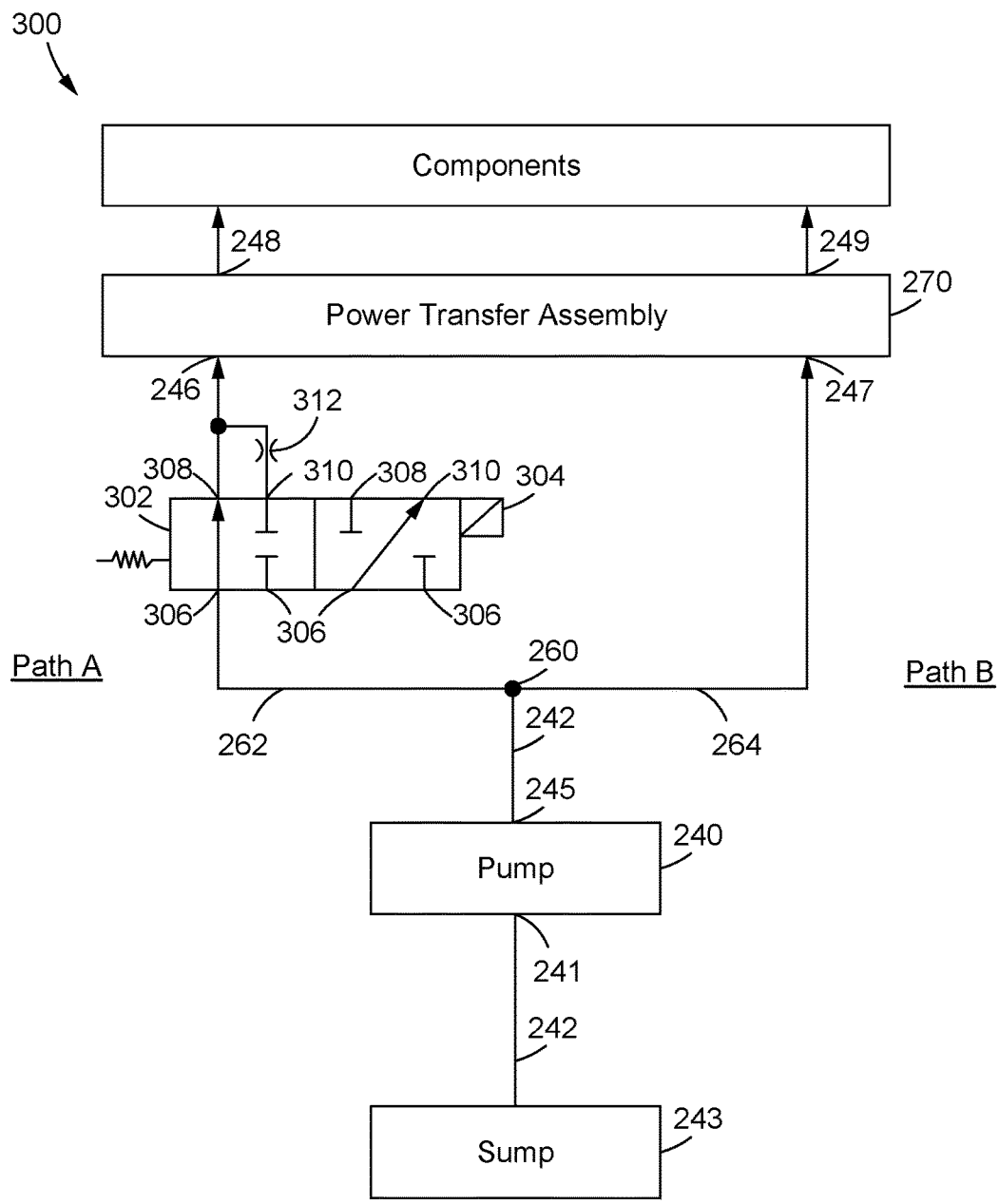
FIG. 3 is a hydraulic schematic showing one exemplary lubrication system.

FIG. 3 is a hydraulic schematic showing one exemplary lubrication system 300. The lubrication system 300 can be implemented, for example, in the transfer case 200 of FIG. 2 using the pump 240 or in any other transfer case of a suitable configuration. In the example associated with FIG. 2, the lubrication system 300 could be disposed on one of the input shaft 204 or the primary output shaft 206 of the transfer case 200. The lubrication system 300 can include the pump 240 as well as a pump housing (not shown) mounted within the transfer case 200 in a manner that restrains the pump housing from rotating in response to rotation of the input shaft 204 or the primary output shaft 206. For example, the pump housing can be fixed to the housing 202 of the transfer case 200.

The pump 240 can include one or more pumping elements (not shown) that are disposed in the pump housing and are operated by rotational force. For example, the pump 240 can be a gerotor pump, and the one or more pumping elements can include an inner pump rotor that is located on the input shaft 204 or the primary output shaft 206 and an outer pump rotor that is an annular member that extends around the inner pump rotor. In conventional gerotor pumps, the inner pump rotor includes a first plurality of teeth and the outer pump rotor includes a second plurality of teeth in greater number than the first plurality of teeth. Typically, the outer pump rotor will include teeth in a number that is one greater than the number of teeth on the inner pump rotor.

The pump 240 may be an electric pump having an integral manifold that can select a flow path for the lubricant into, for example, a first flow path or a second flow path depending on lubricating needs of the components. Alternatively the pump 240 can be a mechanically driven pump.

The pumping elements of the pump 240 are not necessarily driven directly by the input shaft 204 or the primary output shaft 206. Instead, the inner pump rotor may be disposed such that the relevant shaft 204, 206 may rotate independently of the rotation of the inner pump rotor. Rotation of the inner pump rotor causes rotation of the outer pump rotor through meshing of their respective teeth, which creates a low pressure inlet region where the teeth diverge and a high pressure outlet region where the teeth converge.

Referring back to FIG. 2, lubricant can be pressurized by the pump 240 and travel along a fluid flow path from the sump 243, through the oil feed conduit 242, through the inlet ports 246, 247 defined by the primary output shaft 206, through or around the fluid guide insert 500, and out one or more of the outlet ports 248, 249 to lubricate the relevant elements within the transfer case 200.

Lubricant can be pressurized by the pump 240 and travel along a fluid flow path from the sump 243, through the oil feed conduit 242, through a node 260 which divides the flow into two flow paths and through a first flow Path A and/or a second flow Path B. The node 260 may be a manifold or any suitable means for dividing fluid flow into two or more paths. The first flow Path A includes a first conduit 262 leading from the node 260 to a first valve 302 and then to a first inlet port 246. The second flow path B includes a second conduit 264 leading from the node 260 to a second inlet port 247.

More specifically, lubricant following Path A may flow through the first conduit 262, enter the first valve 302 through a first valve inlet 306, exit the first valve 302 via a first valve outlet 308, pass through the first inlet port 246 and then flow through or around the fluid guide insert 500 to the first outlet ports 248 as explained further below, to lubricate certain components within the transfer case 200. Lubricant following Path B may flow through the second conduit 264, through the second inlet port 247 and then flow through or around the fluid guide insert 500 to the second outlet ports 249 to lubricate certain other components within the transfer case 200.

Still referring to FIG. 3, the flow of lubricant can be controlled to meet vehicle demand using the first valve 302 disposed along the first fluid flow Path A leading to those components that do not require constant lubrication. The first valve 302 can be disposed along the first conduit 262 between the pump 240 and the power transfer assembly 270, before the first inlet port 246 of the primary output shaft 206. The first valve 302 can include a control configured to switch between two states that alter the fluid flow path. In the example shown in FIG. 3, the control is a first solenoid 304 that can receive electricity from an external power source (not shown) to switch between being energized (e.g., a first state) and de-energized (e.g., a second state).

In operation, a determination is made as to whether to restrict the flow of lubricant through the lubrication system 300. The determination can be made by a controller such as the ECU 122 of the drivetrain 100 and may be based on, for example, operating conditions of the drivetrain 100.

Mode A—Full Oil Flow:

If flow of lubricant to, say, the clutch 252 is desired, for example, during four-wheel drive operation of the vehicle, the first solenoid 304 can be de-energized in order to open the first valve 302 and the lubricant can flow freely from the first valve inlet 306 to the first valve outlet 308 and then to the first inlet 246. In this example, the lubricant can be supplied from the pump 240 to the various components of the power transfer assembly 270 in fluid communication with the first valve 302, such as the clutch 252, as if no valve 302 were present along the fluid flow path.

Mode B—Restricted Oil Flow:

However, if the flow of lubricant is to be restricted, for example, during two-wheel drive operation of the vehicle, the first solenoid 304 within the first valve 302 can be energized so that the first valve 302 directs the flow of lubricant from the first valve inlet 306 to a first valve alternative outlet 310 where the lubricant encounters a restriction 312. This restriction 312 can slow or stop the flow of lubricant that is delivered to the various components of the power transfer assembly along Path A, such as the clutch 252. This is advantageous in two-wheel drive mode since the clutch 252 is disengaged and the demand for lubricant at the clutch 252, the secondary output shaft 208, the sprockets 250, 254, and the chain 256 is greatly reduced.

Mode C—Oil Flow Alternates Between Full and Restricted:

The first valve 302 also may be used as a metering mechanism, that is, to reduce the flow of lubricant to the clutch 252. This may be accomplished by alternately energizing and de-energizing the solenoid 304 using a predetermined pattern to switch the flow Path A between the first valve outlet 308 and the first valve alternative outlet 310. In another example, the restriction 312 can be variable, that is, the restriction 312 can be controlled to variably meter the flow of lubricant along the fluid flow Path A when lubricant exits the first valve alternative outlet 310. The function of the solenoid 304 can also be reversed, that is, the valve 302 can be designed to allow free flow of lubricant when the solenoid 304 is in the energized state.

Meanwhile, the flow of lubricant through the second flow Path B may be unrestricted, and lubricant can flow freely from the pump 240 through the second conduit 264 and to the second inlet 247. In this example, the lubricant can be supplied from the pump 240 to the various components of the power transfer assembly 270 in fluid communication with the second conduit 264 such as the heat generating bearings and the gear reduction mechanism 210.

Referring back to FIG. 2, the pump 240, node 260 and first valve 302 may be located within the transfer case housing 202, especially if the pump 240, node 260 and valve 302 are mechanical. If the pump 240, node 260 or valve 302 are electric, they may reside outside the transfer case housing 202.

Two Valve System

Figure 4:
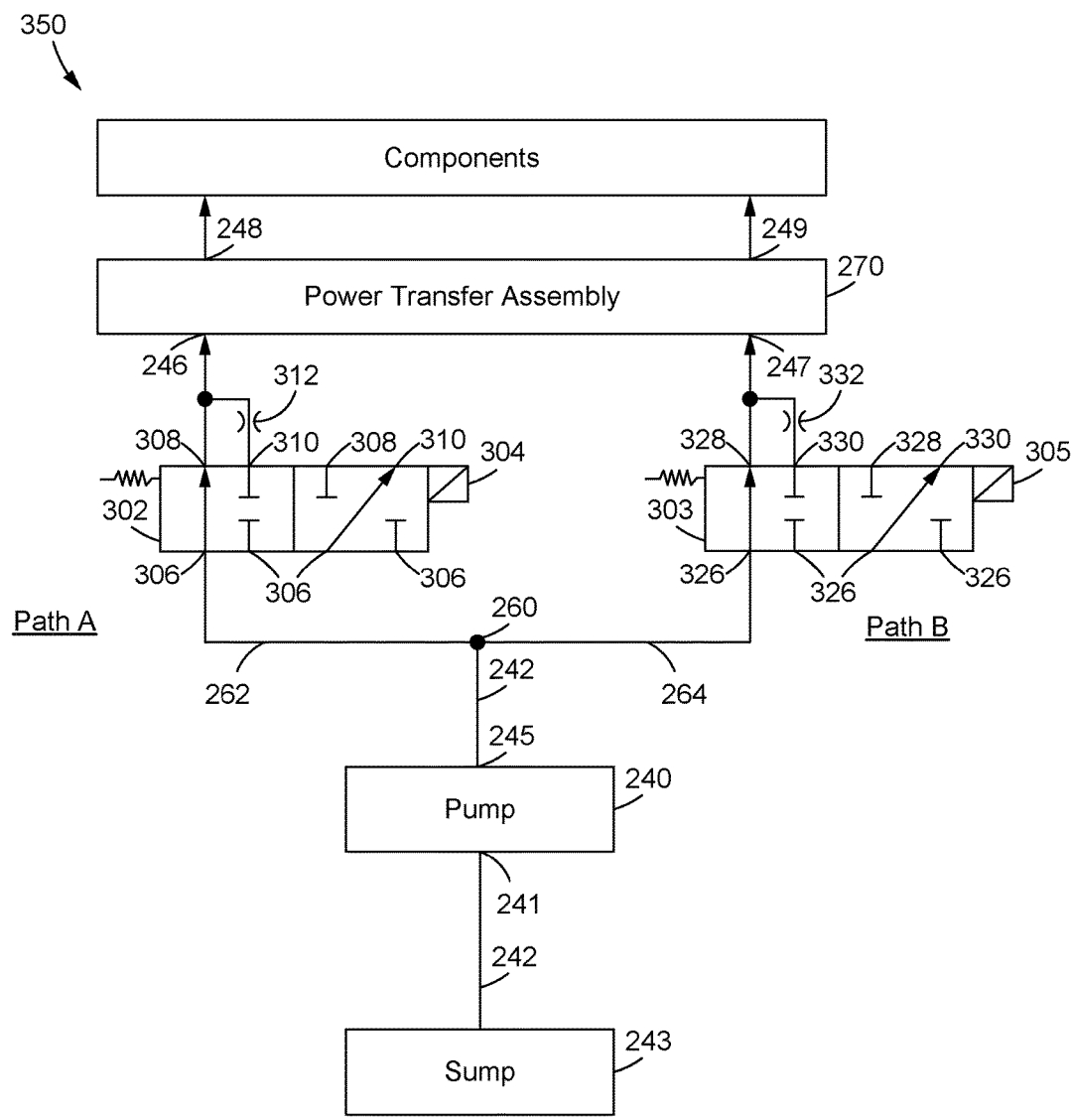
FIG. 4 is a hydraulic schematic showing another exemplary lubrication system.

FIG. 4 is a hydraulic schematic showing another exemplary lubrication system 350. Like in the previous embodiment, the flow of lubricant is controlled to meet vehicle demand using a first valve 302 disposed along the first fluid flow Path A leading to those components that do not require constant lubrication. The first valve 302 may be disposed along the first conduit 262 between the pump 240 and the power transfer assembly 270, before the first inlet port 246 of the primary output shaft 206. The first valve 302 can include a control 304 configured to switch between two states that alter the fluid flow path. In the example shown in FIG. 4, the control is a first solenoid 304 that can receive electricity from an external power source (not shown) to switch between being energized (e.g., a first state) and de-energized (e.g., a second state).

In this embodiment a second valve 303 is disposed along the second fluid flow Path B. The second valve 303 can be disposed along the second conduit 264 between the pump 240 and the power transfer assembly 270, before the second inlet port 247 of the primary output shaft 206. The second valve 303 can include a control 305 configured to switch between two states that alter the fluid flow path. In the example shown in FIG. 4, the control is a second solenoid 305 that can receive electricity from an external power source (not shown) to switch between being energized (e.g., a first state) and de-energized (e.g., a second state). The function of the solenoids 304, 305 can also be reversed, that is, the valves 302, 303 can be designed to allow free flow of lubricant when the solenoids 304, 305 are in the energized state.

The pump 240, the first valve 302 and the second valve 303 all may be located within the transfer case housing 202, especially if the pump 240 and valves 302, 303 are mechanical. If the pump 240 or valves 302, 303 are electric, they may reside outside the transfer case housing 202.

In operation, a determination is made as to whether to restrict the flow of lubricant through either Path A or Path B of the lubrication system 350. The determination can be made by a controller such as the ECU 122 of the drivetrain 100 and may be based on, for example, operating conditions of the drivetrain 100.

In practice, both valves 302, 303 may be opened or closed, resulting in four possible operating modes as noted in the table below:

TABLE I

| Operating Mode | First Valve 302 (Flow Path A) | Second Valve 303 (Flow Path B) |
| --- | --- | --- |
| A | Inactive (Open) | Inactive (Open) |
| B | Active (Restricted) | Inactive (Open) |
| C | Active (Restricted) | Active (Restricted) |
| D | Inactive (Open) | Active (Restricted) |

Mode a—Full Oil Flow in Both Paths A and B:

If flow of lubricant to, say, the clutch 252 is desired, for example, during four-wheel drive operation of the vehicle, the first solenoid 304 can be de-energized in order to open the first valve 302 and the lubricant can flow freely from the first valve inlet 306 to the first valve outlet 308 and then to the first inlet 246. In this example, the lubricant can be supplied from the pump 240 to the various components of the power transfer assembly 270 in fluid communication with the first valve 302, such as the clutch 252, as if no valve 302 were present along the fluid flow path.

Meanwhile, a determination may be made as to whether to restrict the flow of lubricant through the second flow Path B using second valve 303. The determination can be made by a controller such as the ECU 122 of the drivetrain 100 based on, for example, operating conditions of the drivetrain 100. If restriction of the flow of lubricant to the components in fluid communication with the second valve 303 is not desired, the second solenoid 305 can be de-energized, deactivating the second valve 303 so the lubricant can flow freely from a second valve inlet 326 to a second valve outlet 328 and then to the second inlet 247. Thus, lubricant can be supplied from the pump 240 to the various components of the power transfer assembly 270 in fluid communication with the second valve 303, such as the heat generating bearings and the gear reduction mechanism 210 as if no second valve 303 were present along the fluid flow path.

Mode B—Restricted Flow in Path A and Full Oil Flow in Path B:

However, if the flow of lubricant in path A is to be restricted, for example, during two-wheel drive operation of the vehicle, the first solenoid 304 within the first valve 302 can be energized so that the first valve 302 directs the flow of lubricant from the first valve inlet 306 to the first valve alternative outlet 310 where the lubricant encounters a restriction 312. This restriction 312 can slow or stop the flow of lubricant that is delivered to the various components of the power transfer assembly along Path A, such as the clutch 252. This is advantageous in two-wheel drive mode since the clutch 252 is disengaged and the demand for lubricant at the clutch 252, the secondary output shaft 208, the sprockets 250, 254, and the chain 256 is greatly reduced. Lubricant flow through path B remains unrestricted as in Mode A above.

Mode C—Restricted Flow in Path A and in Path B:

If the flow of lubricant in Path B also is to be restricted for whatever reason, the second solenoid 305 within the second valve 303 can be energized so that the second valve 303 directs the flow of lubricant from the second valve inlet 326 to the second valve alternative outlet 330 where the lubricant encounters a second restriction 332. This second restriction 332 can slow or stop the flow of lubricant that is delivered to the various components of the power transfer assembly along Path B.

Mode D—Full Flow in Path A and Restricted Flow in Path B:

If full flow of lubricant through Path A is desired, the first solenoid 304 can be de-energized in order to open the first valve 302 and the lubricant can flow freely from the first valve inlet 306 to the first valve outlet 308 and then to the first inlet 246. Lubricant can then be supplied from the pump 240 to the various components of the power transfer assembly 270 in fluid communication with the first valve 302 as if no valve 302 were present along the fluid flow path.

Meanwhile, if the flow of lubricant in Path B also is to be restricted for whatever reason, the second solenoid 305 within the second valve 303 can be energized so that the second valve 303 directs the flow of lubricant from the second valve inlet 326 to the second valve alternative outlet 330 where the lubricant encounters a second restriction 332. This second restriction 332 can slow or stop the flow of lubricant that is delivered to the various components of the power transfer assembly along Path B.

Three Valve System

Figure 5:
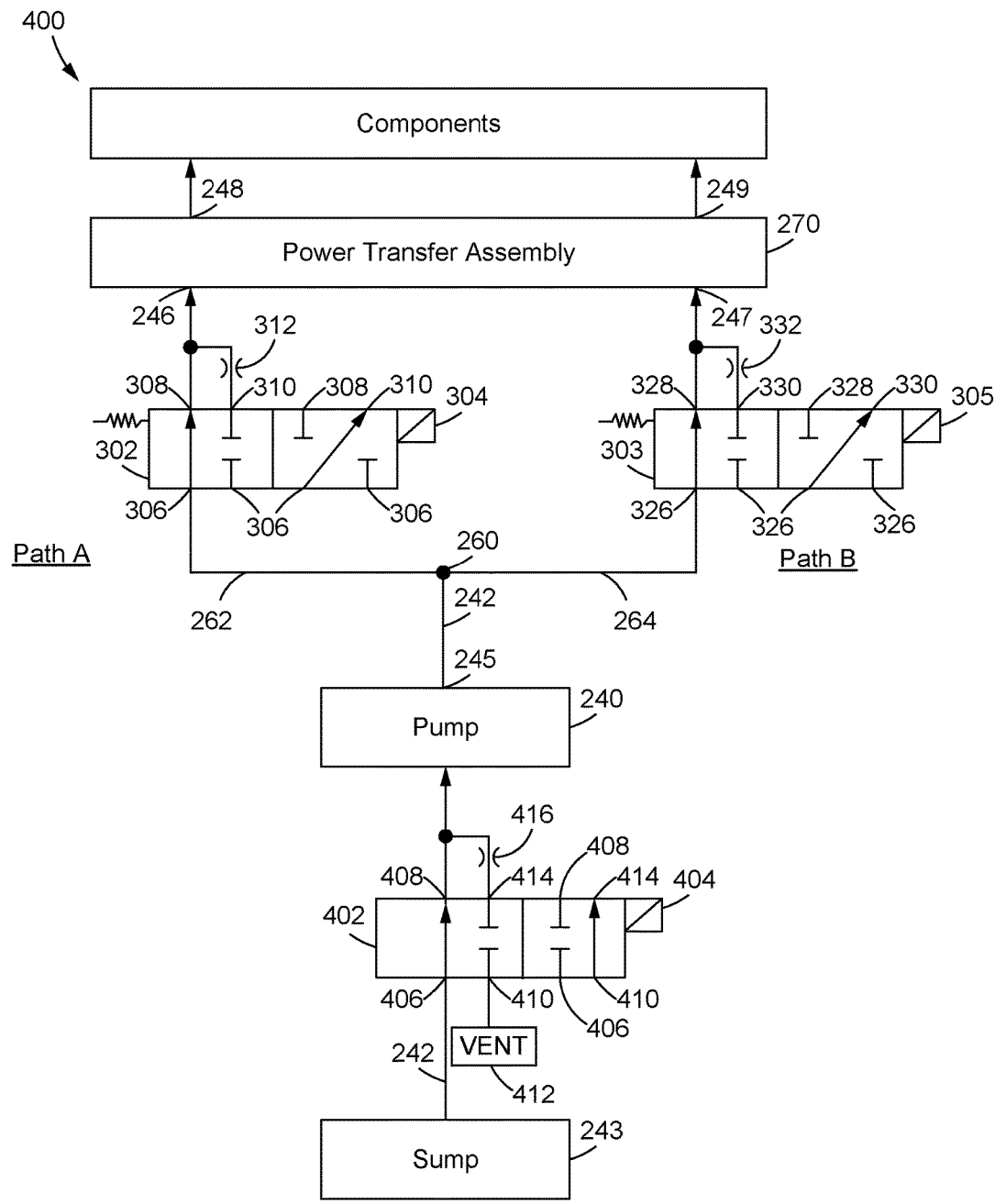
FIG. 5 is a hydraulic schematic showing another exemplary lubrication system.

FIG. 5 is a hydraulic schematic showing another exemplary lubrication system 400. The lubrication system 400 can also be implemented, for example, in the transfer case 200 of FIG. 2 using the pump 240 or in any other transfer case of a suitable configuration. The flow of lubricant can be metered to meet vehicle demand using the first valve 302 and the second valve 303 and also a third valve 402 disposed along the fluid flow path. In the illustrated example, the third valve 402 is disposed along the oil feed conduit 242 between the sump 243 and the pump 240 between a third valve inlet 406 and a third valve outlet 408. The first valve 302 and the second valve 303 may have the same functionality as the first and second valves 302, 303 described above with respect to other embodiments.

The flow of lubricant to both Path A and Path B can be controlled using the third valve 402 disposed along the oil feed conduit 242. In operation, a determination is made as to whether to restrict the flow of lubricant through the lubrication system 400. The determination can be made by a controller such as the ECU 122 of the drivetrain 100 and may be based on, for example, operating conditions of the drivetrain 100.

The third valve 402 may be used to break the vacuum on the inlet line to the pump 240, that is, oil feed conduit 242, to reduce consumption even further than in the previous embodiments. Instead of the pump 240 drawing lubricant at all times, the lubrication may be completely turned off if conditions warrant by activating the third valve 402, which beaks the vacuum into the pump and stops the flow of lubricant.

The third valve 402 can include a control 404 configured to switch between two states that alter the fluid flow path. In the example shown in FIG. 5, the control may comprise a third solenoid 404 which can be actuated and de-actuated in order to switch between a first state and a second state. Though a solenoid 404 is shown, it is also possible to use another control mechanism to switch between the two states of the valve 402.

Mode A—Full Lubricant Flow:

In operation, a determination is made as to whether to restrict the flow of lubricant through the lubrication system 400. If restriction of the flow of lubricant is not desired, for example, during four-wheel drive operation of the vehicle, the control 404 can be de-actuated, and the lubricant can flow freely from a third valve inlet 406 to a third valve outlet 408. In this example, the lubricant can be supplied to pump 240 from the sump 243 as if no valve 402 were present along the fluid flow path.

Mode B—Restricted Lubricant Flow:

However, if the flow of lubricant is to be restricted, for example, during two-wheel drive operation of the vehicle, the third solenoid 404 within the third valve 402 can be actuated, and the third valve 402 can block the flow of lubricant from the third valve inlet 406 to the third valve outlet 408. This change to the fluid flow path stops lubricant from reaching the pump 240 and the components in the power transfer assembly 270.

At the same time, a third valve air inlet 410 may be opened to a vent 412 that can direct airflow at atmospheric pressure from the third valve air inlet 410 to a third valve alternative outlet 414 that is also in fluid communication with the pump 240. By opening the vent 412, pump 240 is configured to draw air instead of lubricant, and the pumping components can spin more freely without the burden of drawing lubricant along the fluid flow path.

The function of the third solenoid 404 can also be reversed, that is, the third valve 402 can be designed to allow free flow of lubricant when the third solenoid 404 is actuated.

The third valve alternative outlet 414 may be in fluid communication with a third restriction 416 disposed along the oil feed conduit 242 extending between the lubricant source 243 and the power transfer assembly 270. This third restriction 416 can slow or stop the flow of lubricant that is delivered to the pump.

Figure 6:
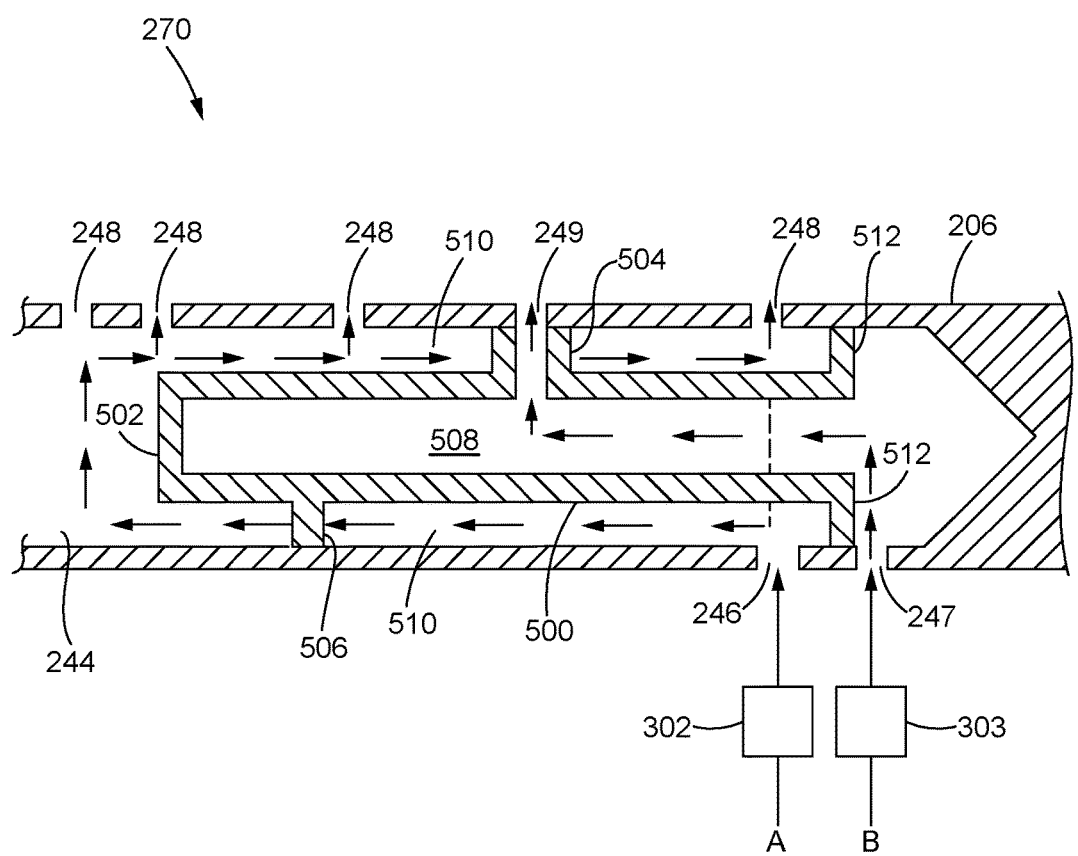
FIG. 6 is a cross-sectional view of an exemplary fluid guide insert.

FIG. 6 is a cross-sectional view of part of an exemplary power transfer assembly 270, including a primary output shaft 206 and a fluid guide insert 500. The fluid guide insert 500 may be located within the primary output shaft 206 and may be installed by sliding it within the bore 244 of the primary output shaft 206.

The fluid guide insert 500 may comprise a center element 502, outlet ports 504, guides 506 and seals 512. The center element 502 may be cylindrical and may help define a cylindrical interior space 508 and an annular (exterior) space 510. Each outlet port 504 may extend radially from the center element and may be in fluid communication with the interior space 508. The guides 506 may extend radially between the center element 502 and the inner surface of the primary output shaft 206 to both locate and stabilize the fluid guide insert 500 within the shaft 206. The outlet ports 504 may also function as guides to help locate and stabilize the fluid guide insert 500 within the shaft 206. The seals 512 provide a fluid tight seal against the interior surface of the shaft 206, thus providing a fluid tight seal between the interior space 508 of the fluid guide insert 500 and the exterior space 510 around the fluid guide insert 500. The outlet ports 504 may also function as seals against the interior surface of the shaft 206.

The fluid guide insert 500 may be configured to control the flow of lubricant from the inlet ports 246, 247 to the outlet ports 248, 249. For example, lubricant may flow through the first inlet port 246 into the annular space 510 around the fluid guide insert 500 and then out through the first outlet port(s) 248. In other words, fluid may flow along Path A to the inlet 246, through the fluid guide insert 500 and out through the outlet(s) 248. Other fluid may flow along Path B through the second inlet port 247 into the interior space 508 of the center element 502 and then out through the second outlet port(s) 249.

It should be understood that the fluid guide insert may be any suitable shape or configuration that adequately directs the flow of fluid through multiple paths from the pump 240 to the transfer case components.

INDUSTRIAL APPLICABILITY

The disclosed lubrication system may be used with any suitable drivetrain, including drivetrains in gasoline and diesel powered vehicles as well as hybrid and fully electric vehicles. The lubrication system provides an efficient and simple way to distribute lubricant among various components on an as needed basis.

While the disclosure has been made in connection with what is presently considered to be the most practical and preferred embodiment, it should be understood that the disclosure is intended to cover various modifications and equivalent arrangements.

The invention claimed is:

1. A lubrication system for a transfer case, comprising:
a pump that is operable to supply a lubricant along at least two fluid flow paths extending from a lubricant source to one or more transfer case components, the pump comprising a pump inlet in fluid communication with the lubricant source and a pump outlet in fluid communication with the one or more transfer case components;
a node in fluid communication with the pump outlet and configured to divide fluid flow into a first conduit and a second conduit arranged in parallel;
a power transfer assembly including a first inlet port, a second inlet port located downstream of and in fluid communication with the second conduit, one or more first outlet ports in fluid communication with the first inlet port and one or more second outlet ports in fluid communication with the second inlet port;
a fluid guide insert disposed within the power transfer assembly and configured to direct the flow of fluid from the first inlet port to the one or more first outlet ports and from the second inlet port to the one or more second outlet ports;
a first valve disposed along the first conduit extending between the node and the power transfer assembly, the first valve including a first valve inlet, a first valve outlet and a first valve alternative outlet, the first valve outlet and the first valve alternative outlet located upstream and in fluid communication with the first valve inlet, the first valve outlet and the first valve alternative outlet located downstream and in fluid communication with the first inlet port of the power transfer assembly, the first valve being operable between a first state in which fluid flows through the first valve outlet and is not restricted and a second state in which fluid flows through the first valve alternative outlet and is restricted; and
a control that is operable to set the state of the first valve to either the first state or the second state.

2. The lubrication system of claim 1 wherein the power transfer assembly includes a primary output shaft having a bore, the first and second outlet ports are positioned along the primary output shaft, and the fluid guide insert is located within the bore.

3. The lubrication system of claim 2 wherein the fluid guide insert comprises:
a center element defining an interior space in fluid communication with the second inlet port and the second outlet ports, and the center element and the primary output shaft define an annular space in fluid communication with the first inlet port and the first outlet ports.

4. The lubrication system of claim 3 wherein the fluid guide insert further comprises:
at least one fluid guide insert outlet port extending from the center element and in sealing engagement with the shaft, each fluid guide insert outlet port in fluid communication with a second outlet port.

5. The lubrication system of claim 1, wherein the first valve alternative outlet is in fluid communication with a restriction disposed along the first conduit extending between the lubricant source and the power transfer assembly.

6. The lubrication system of claim 1 further comprising:
a second valve disposed along the second conduit extending between the node and the power transfer assembly, the second valve including a second valve inlet, a second valve outlet and an second valve alternative outlet, the second valve outlet and the second valve alternative outlet located upstream and in fluid communication with the second valve inlet, the second valve outlet and the second valve alternative outlet located downstream and in fluid communication with the second inlet port of the power transfer assembly, the second valve being operable between a first state in which fluid flow s through the second valve outlet and is not restricted and a second state in which fluid flows through the second valve alternative outlet and is restricted; and
a second valve control that is operable to set the state of the second valve to either the first state or the second state.

7. The lubrication system of claim 6, wherein:
the second valve alternative outlet is in fluid communication with a second restriction disposed along the second conduit extending between the lubricant source and the power transfer assembly.

8. The lubrication system of claim 6 further comprising:
a third valve disposed along the oil feed conduit extending between the lubricant source and the pump, the third valve including a third valve inlet, a third valve outlet and an third valve alternative outlet, the third valve outlet and the third valve alternative outlet located upstream and in fluid communication with the third valve inlet, the third valve outlet and the third valve alternative outlet located downstream and in fluid communication with the pump, the third valve being operable between a first state in which fluid flow is not restricted and a second state in which fluid flow is restricted; and
a third valve control that is operable to set the state of the third valve to either the first state or the second state.

9. The lubrication system of claim 8, wherein:
the third valve alternative outlet is in fluid communication with a third restriction disposed along the oil feed conduit extending between the lubricant source and the power transfer assembly.

10. The lubrication system of claim 8, wherein the third valve comprises a third valve air inlet in fluid communication with a vent, and the vent is configured to direct airflow from the third valve air inlet to a third valve alternative outlet that is in fluid communication with the pump.

11. A transfer case for a vehicle, comprising:
a power transfer assembly comprising an input shaft, a primary output shaft, a secondary output shaft, and a transfer clutch that is operable to transfer power from one of the input shaft and the primary output shaft to the secondary output shaft when the transfer clutch is in an engaged position;
a pump that is operable to supply a lubricant along at least two fluid flow paths extending from a lubricant source to the power transfer assembly, the pump comprising a pump inlet in fluid communication with the lubricant source and a pump outlet in fluid communication with the power transfer assembly;
a node located upstream of the power transfer assembly and in fluid communication with the pump outlet and configured to divide fluid flow into a first conduit and a second conduit arranged in parallel;
the primary output shaft including a first inlet port, a second inlet port located downstream of and in fluid communication with the second conduit, one or more first outlet ports in fluid communication with the first inlet port and one or more second outlet ports in fluid communication with the second inlet port;
a fluid guide insert disposed within the primary output shaft and configured to direct the flow of fluid from the first inlet port to the one or more first outlet ports and from the second inlet port to the one or more second outlet ports;
a first valve disposed along the first conduit, the first valve including a first valve inlet, a first valve outlet and a first valve alternative outlet, the first valve outlet and the first valve alternative outlet located upstream and in fluid communication with the first valve inlet, the first valve outlet and the first valve alternative outlet located downstream and in fluid communication with the first inlet port of the power transfer assembly, the first valve being operable between a first state in which fluid flows through the first valve outlet and is not restricted and a second state in which fluid flows through the first valve alternative outlet and is restricted; and
a control that is operable to set the state of the first valve to either the first state or the second state.

12. The transfer case of claim 11 wherein the fluid guide insert comprises:
a center element defining an interior space in fluid communication with the second inlet port and the second outlet ports, and
the center element and the primary output shaft define an annular space in fluid communication with the first inlet port and the first outlet ports.

13. The transfer case of claim 12 wherein the fluid guide insert further comprises:
at least one fluid guide insert outlet port extending from the center element and in sealing engagement with the shaft, each fluid guide insert outlet port in fluid communication with a second outlet port.

14. The transfer case of claim 11, wherein the first valve alternative outlet is in fluid communication with a restriction disposed along the first conduit extending between the lubricant source and the power transfer assembly.

15. The transfer case of claim 11 further comprising:
a second valve disposed along the second conduit extending between the node and the power transfer assembly, the second valve including a second valve inlet, a second valve outlet and an second valve alternative outlet, the second valve outlet and the second valve alternative outlet located upstream and in fluid communication with the second valve inlet, the second valve outlet and the second valve alternative outlet located downstream and in fluid communication with the second inlet port of the power transfer assembly, the second valve being operable between a first state in which fluid flow s through the second valve outlet and is not restricted and a second state in which fluid flows through the second valve alternative outlet and is restricted; and a second valve control that is operable to set the state of the second valve to either the first state or the second state.

16. The transfer case of claim 15, wherein:

the second valve alternative outlet is in fluid communication with a second restriction disposed along the second conduit extending between the lubricant source and the power transfer assembly.

17. The transfer case of claim 15 further comprising:

a third valve disposed along the oil feed conduit extending between the lubricant source and the pump, the third valve including a third valve inlet, a third valve outlet and an third valve alternative outlet, the third valve outlet and the third valve alternative outlet located upstream and in fluid communication with the third valve inlet, the third valve outlet and the third valve alternative outlet located downstream and in fluid communication with the pump, the third valve being operable between a first state in which fluid flow is not restricted and a second state in which fluid flow is restricted; and a third valve control that is operable to set the state of the third valve to either the first state or the second state.

18. The transfer case of claim 17, wherein:

the third valve alternative outlet is in fluid communication with a third restriction disposed along the oil feed conduit extending between the lubricant source and the power transfer assembly.

19. The transfer case of claim 17, wherein the third valve comprises a third valve air inlet in fluid communication with a vent, and the vent is configured to direct airflow from the third valve air inlet to a third valve alternative outlet that is in fluid communication with the pump.

* * * * *